United States Patent
Yang et al.

[11] Patent Number: 5,818,134
[45] Date of Patent: Oct. 6, 1998

[54] MOTOR FOR MOTORCYCLES

[76] Inventors: Ying-Yen Yang, No. 43, Sec. 1, Chung Hsin Road, San Chung Shih, Taipei Hsien; Tsung-Ming Huang, 2F, No. 6, Lane 7, Hsia Shu Lin Road, Shih Lin District, Taipei, both of Taiwan

[21] Appl. No.: 841,456

[22] Filed: Apr. 22, 1997

[51] Int. Cl.$^6$ ................................................ H02K 7/06
[52] U.S. Cl. .................. 310/78; 310/67 A; 310/75 R; 180/65.3; 180/65.6
[58] Field of Search .................... 310/67 A, 78, 310/75 R, 92; 180/65.1, 65.3, 65.4, 65.5, 65.6

[56] References Cited

U.S. PATENT DOCUMENTS

| | | | |
|---|---|---|---|
| 3,652,883 | 3/1972 | Cone | 310/74 |
| 3,921,741 | 11/1975 | Garfinckle et al. | 180/34 |
| 4,539,497 | 9/1985 | Boyer | 310/75 R |
| 4,830,163 | 5/1989 | Miyazaki et al. | 192/105 CD |
| 5,272,938 | 12/1993 | Hsu et al. | 310/83 |

FOREIGN PATENT DOCUMENTS 1-286750  11/1989  Japan ........................... H02K 7/18

*Primary Examiner*—Steven L. Stephan
*Assistant Examiner*—B. Mullins
*Attorney, Agent, or Firm*—Rosenberg, Klein & Bilker

[57] ABSTRACT

A motor for motorcycles includes a shaft, a rotor, an inner housing covering the rotor, a sun and planet gear unit, a generator, an outer housing, and a clutch as main components. The generator produces electricity to charge a battery when the motor moves the motorcycle so that the battery is always fully charged for operating the motor. The clutch will not engage a wheel of the motorcycle to rotate until rotation of the motor reaches a preset speed.

1 Claim, 3 Drawing Sheets

MOTOR FOR MOTORCYCLES

BACKGROUND OF THE INVENTION

This invention relates to a motor for motorcycles, and particularly to a system for charging a battery when the motor rotates, saving the trouble of removing the battery for charging while the motorcycle is not in use.

At present, motorcycles having motors for their motive power source, have a troublesome problem that the battery for supplying electricity to the motor has to be frequently charged while the motorcycle is not in use.

SUMMARY OF THE INVENTION

The purpose of the invention is to offer a motor for motorcycles, provided with a generator for producing electricity while the motorcycle is moving so that a battery can always be fully charged for use by the motor to move the motorcycle, without a need to be removed from the motorcycle for charging.

A main feature of the invention is a clutch and a generator assembly additionally coupled to the motorcycle's motor for charging a battery during movement of the motorcycle. The clutch will not engage to transmit the motive power to a wheel, until rotation of the motor reaches a preset speed, thereby saving electricity.

BRIEF DESCRIPTION OF THE DRAWINGS

This invention will be better understood by referring to the accompanying Drawings, wherein.

DESCRIPTION OF THE PREFERRED EMBODIMENT

Figure 1:
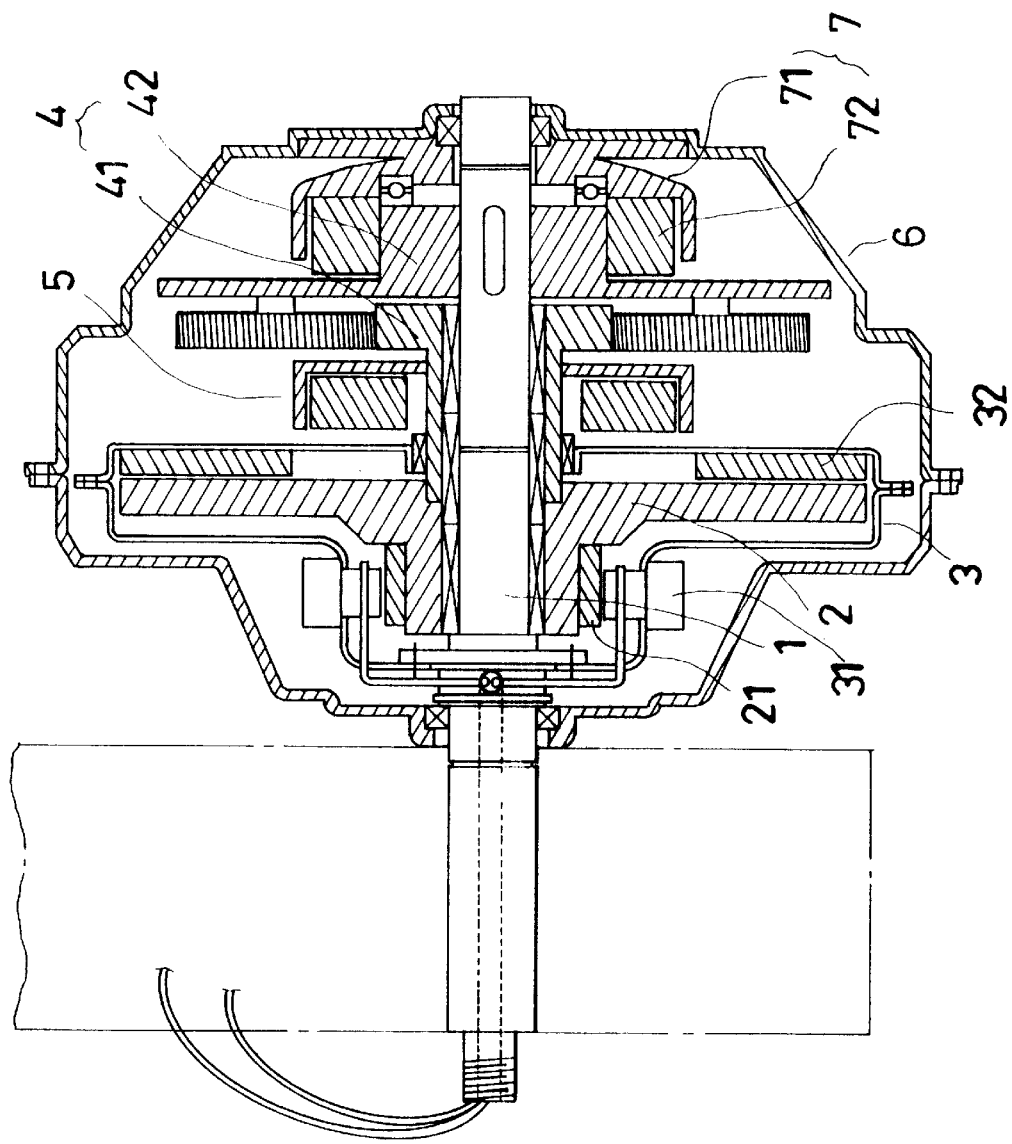
FIG. 1 is a cross-sectional view of a motor for motorcycles according to the present invention.

A motor for a motorcycle, as shown in FIG. 1, includes a shaft 1, a rotor 2, an inner housing 3, a sun and planet gear unit 4, a generator 5, an outer housing 6 and a clutch 7 as main components that are combined together.

The rotor 2 is pivotally mounted on the shaft 1, and the inner housing 3 is fixed firmly to the shaft 1 for covering the rotor 2. Two carbon brushes 31, 31 are fixed within a small-diameter portion of the inner housing 3 and extend inwardly to contact two copper poles 21, 21 of the rotor 2. The copper poles 21, 21 are connected with a coil of the rotor 2. A plurality of magnets 32 are provided within the inner housing 3 near a right side of the housing 3, for interfacing with the coil of the rotor 2.

The sun and planet gear unit 4 is coupled to the shaft 1, on the right side of the inner housing 3, for rotation thereon. The sun and planet gear unit 4 has a sun gear 41 fixed firmly to the rotor 2 for rotation therewith, and a generator 5 is fixed to the sun gear 41 and synchronously rotates together therewith, generating electricity to charge the battery of a motorcycle.

The outer housing 6 is pivotally connected to the shaft 1 for hiding and protecting all the components described above.

Figure 2:
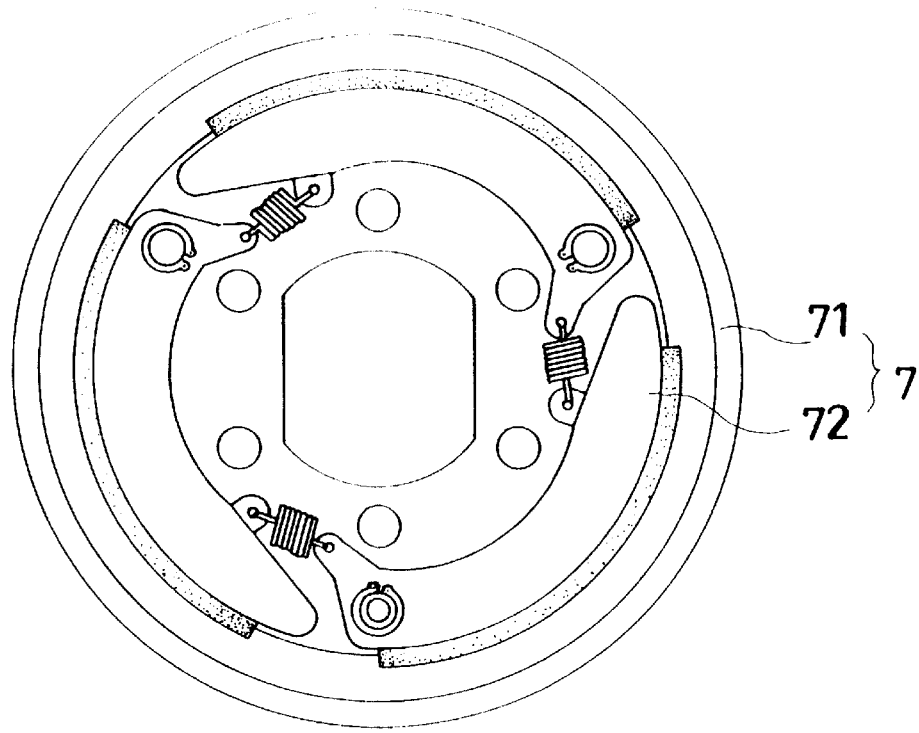
FIG. 2 is a front view of a clutch body and a transmitting means of the present invention before they engage with each other.

The clutch 7 is combined in the outer housing 6, as shown in FIGS. 1 and 2, having a clutch body 71 fixed firmly to the outer housing 6 and a transmitting means 72 engaged to an output gear 42 of the sun and planet gear unit 4.

Figure 4:
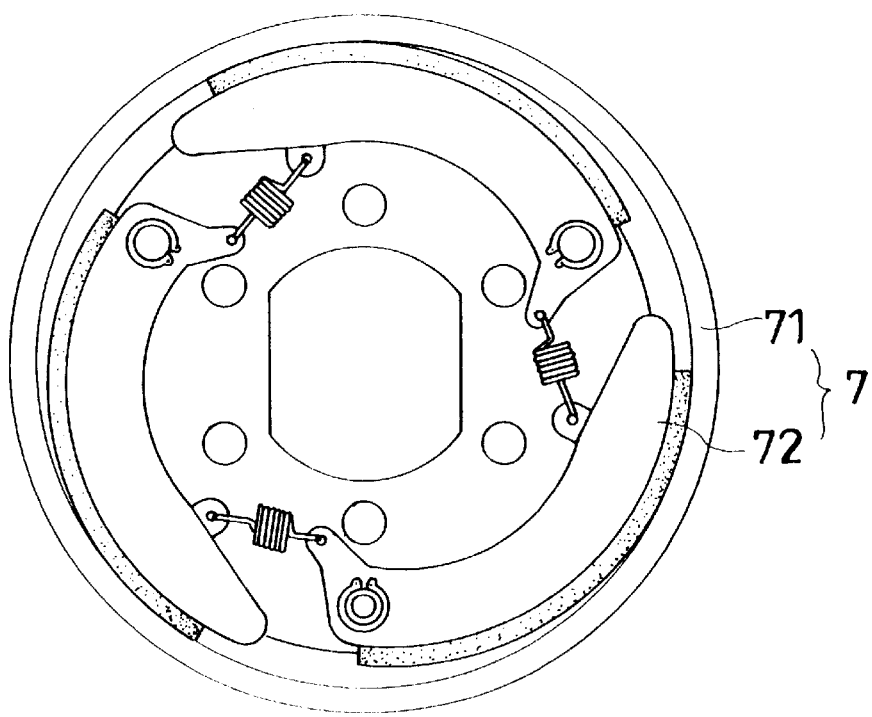
Figure 3:
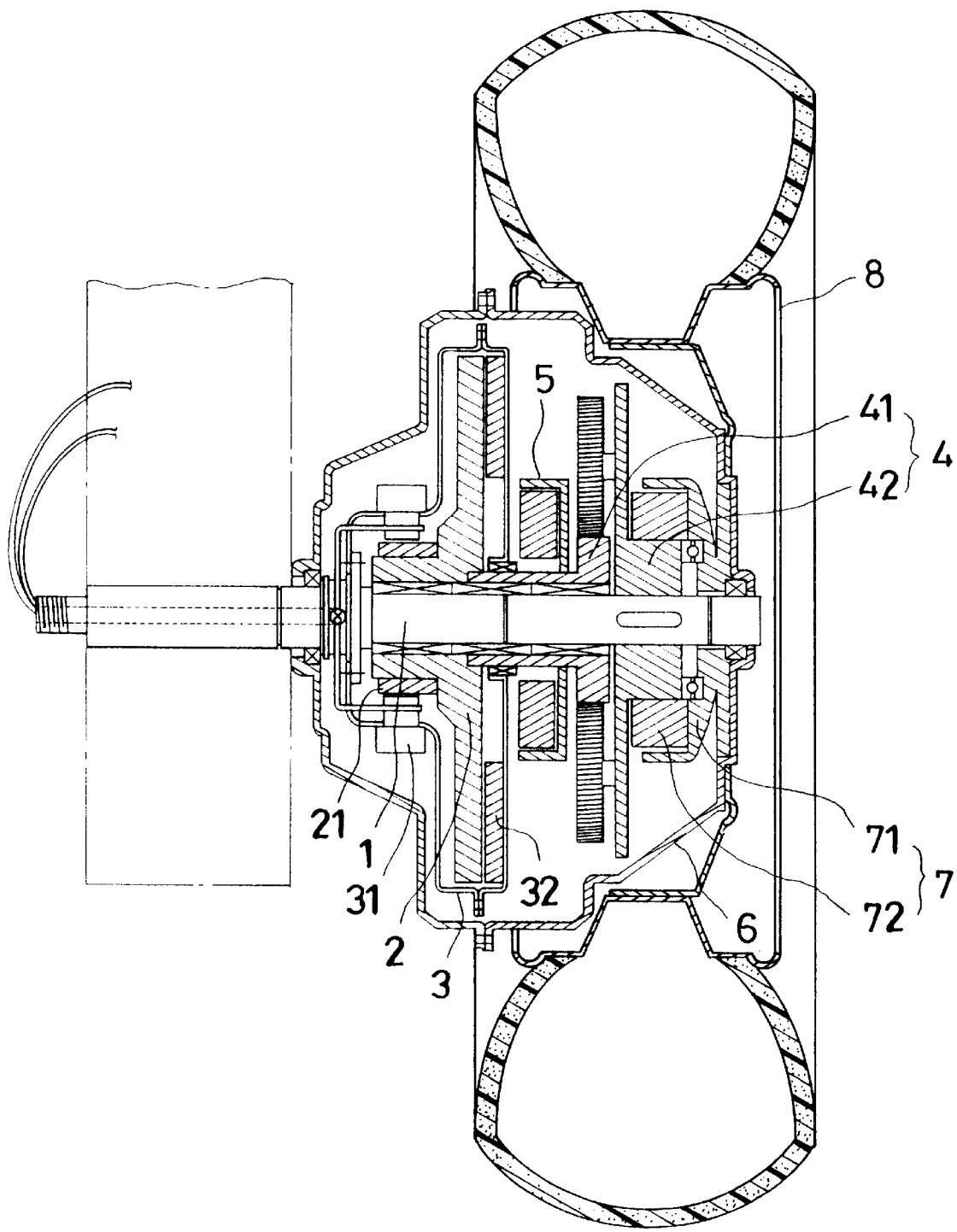
FIG. 3 is a cross-sectional view of the motor of the present invention combined with a wheel frame; and, FIG. 4 is a front view of the clutch body and the transmitting means of the present invention after they engaged with each other.

In use, referring to FIG. 3, the outer housing 6 is coupled firmly to a wheel frame 8 of a motorcycle. The carbon brushes 31, 31 are connected to the copper poles 21, 21 of the coil of the rotor 2. Then, when the coil of the rotor 2 is electrified by a battery, the rotor 2 will be rotated by the magnetic field produced by the magnets 32. The sun and planet gear unit 4 is rotated by the rotor 2, as is the generator 5, which then produces electricity to charge the battery, so that the battery may always have sufficient electric power to rotate the motor. Meanwhile, the clutch body 71 is not contacted by the transmitting means 72 unless the rotor 2 rotates with more than 800 rpm, as illustrated in FIG. 2. If the rotation of the rotor 2 reaches 800 or more rpm, the transmitting means 72 will engage with the clutch body 71 by centrifugal force, as shown in FIG. 4, thereby rotating the outer housing 6 and the wheel frame 8 together.

As can be understood from the above description, this invention has the following advantages.

1. When the rotor of the motor is rotating, the generator is also rotated at the same time to generate electricity to charge the battery, which then always has enough electric charge for the motor to operate, without the necessity of removing the battery for charging, while the motorcycle is not in use.

2. The motor does not begin to rotate the wheel until rotation of the motor reaches a preset speed, saving more electricity than that of a conventional motorcycle with a motor.

3. The motor according to the present invention may be widely applied to various kinds of wheel frames of motorcycles.

While the preferred embodiment of the invention has been described above, it will be recognized and understood that various modifications may be made therein and the appended Claims are intended to cover all such modifications which may fall within the spirit and scope of the invention.

What is claimed is:

1. A motor for motorcycles, comprising:

a shaft;

a rotor rotatively coupled to said shaft, said rotor having a plurality of conductive poles coupled thereto;

an inner housing secured to said shaft and enclosing said rotor;

a pair of carbon brushes secured to said inner housing for electrical coupling with said plurality of conductive poles as said rotor rotates;

a plurality of magnets disposed within said inner housing adjacent said rotor;

a sun gear rotatively disposed on said shaft and coupled to said rotor for rotation therewith;

an electric generator coupled to said sun gear for rotation therewith to provide an electrical output for charging a battery;

a plurality of planet gears pivotally coupled to an output gear and engaged to said sun gear to rotatably drive said output gear, said output gear being coupled to said shaft;

an outer housing rotatively coupled to said shaft and secured to a wheel of the motorcycle; and, a clutch having a clutch body coupled to said outer housing and means coupled to said plurality of planet gears for transmitting rotational forces from said plurality of planet gears to said clutch body responsive to said transmitting means being rotated above a predetermined speed.

* * * * *